United States Patent [19]
Lovell

[11] Patent Number: 5,216,978
[45] Date of Patent: Jun. 8, 1993

[54] FELINE TOY AND EXERCISER

[76] Inventor: William J. Lovell, P.O. Box 6905, St. Louis, Mo. 63123

[21] Appl. No.: 890,844

[22] Filed: Jun. 1, 1992

[51] Int. Cl.5 ............................................ A01K 29/00
[52] U.S. Cl. .......................................... 119/29; 40/331
[58] Field of Search ................ 119/29, 29.5; 40/617, 40/331, 332

[56] References Cited

U.S. PATENT DOCUMENTS

| | | | |
|---|---|---|---|
| 2,194,736 | 3/1940 | De Bruler | 119/29 |
| 2,698,598 | 1/1955 | Hadley | 119/29 |
| 3,085,551 | 4/1963 | Helmer | 119/29 |
| 3,916,838 | 11/1975 | Swat | 119/29 |
| 4,712,510 | 12/1987 | Tae-Ho | 119/29 |
| 4,897,945 | 2/1990 | Webb | 40/331 |
| 5,038,703 | 8/1991 | Frush | 119/29 |
| 5,111,771 | 5/1992 | Mathews | 119/29 |

Primary Examiner—John G. Weiss

[57] ABSTRACT

A feline toy comprised of a body with a vertical and horizontal portion which when mounted over an existing door knob will provide a platform from which a target may be tethered.

1 Claim, 2 Drawing Sheets

FELINE TOY AND EXERCISER

BACKGROUND

The object of the present invention is to provide a durable platform from which a tethered target will be batted about by a feline. Said platform being easily mounted to an existing door knob. Prior art make use of suction cups to mount similar apparatus to a surface. The suction cups become quite strained during the battering and most often disengage from the surface. The invention will make use of an existing door knob eliminating the problem inherent with suction cups.

SUMMARY OF INVENTION

It is the object of the invention to provide a durable toy and exerciser for felines, while overcoming the problems of durability known in prior art. These and other objects of the invention will become more apparent from the following detailed disclosure, claims, and by reference to the accompany drawing in which:

DETAILED DESCRIPTION

Figure 1:
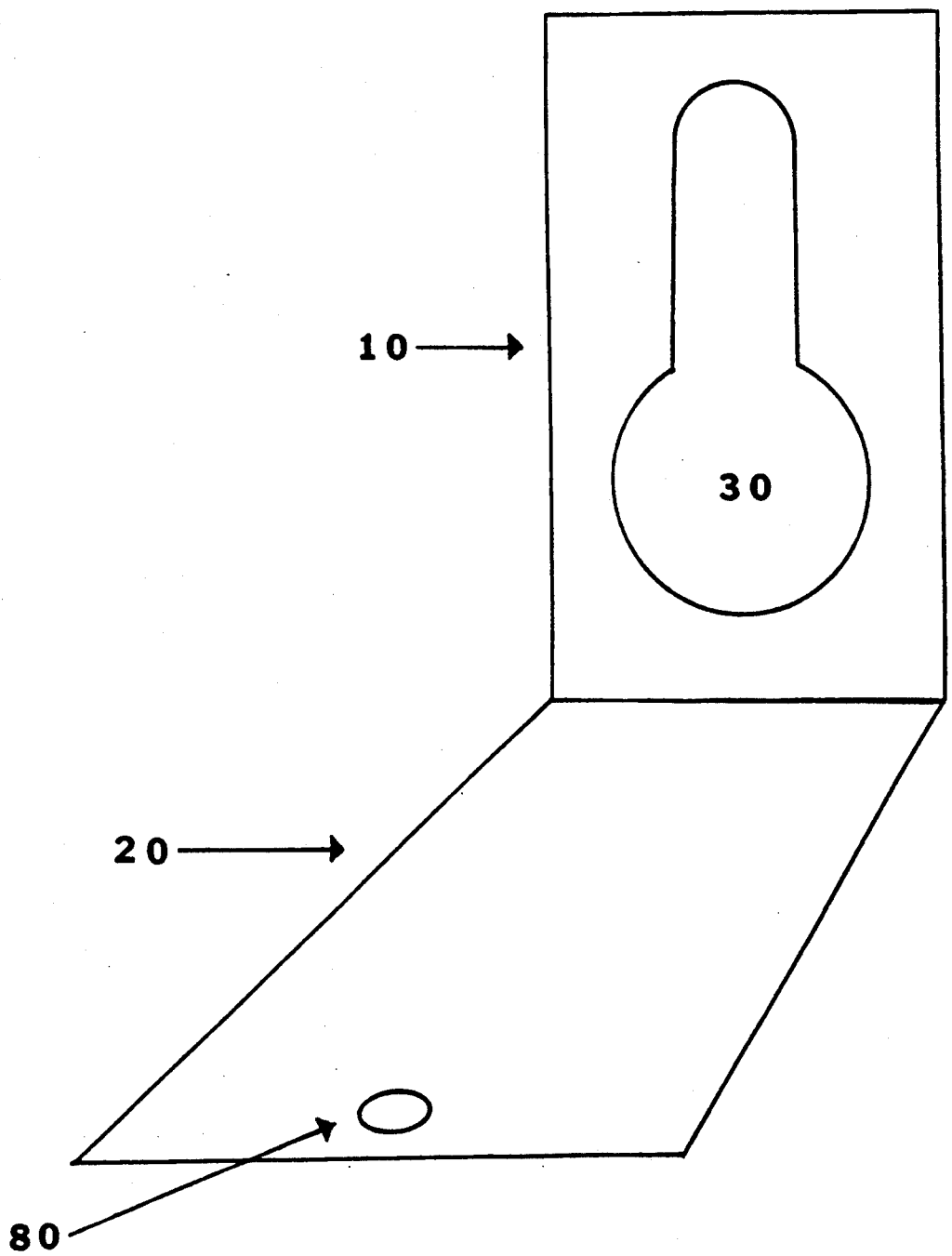
FIG. 1 is a side elevation view of the toy and exerciser.
Figure 2:
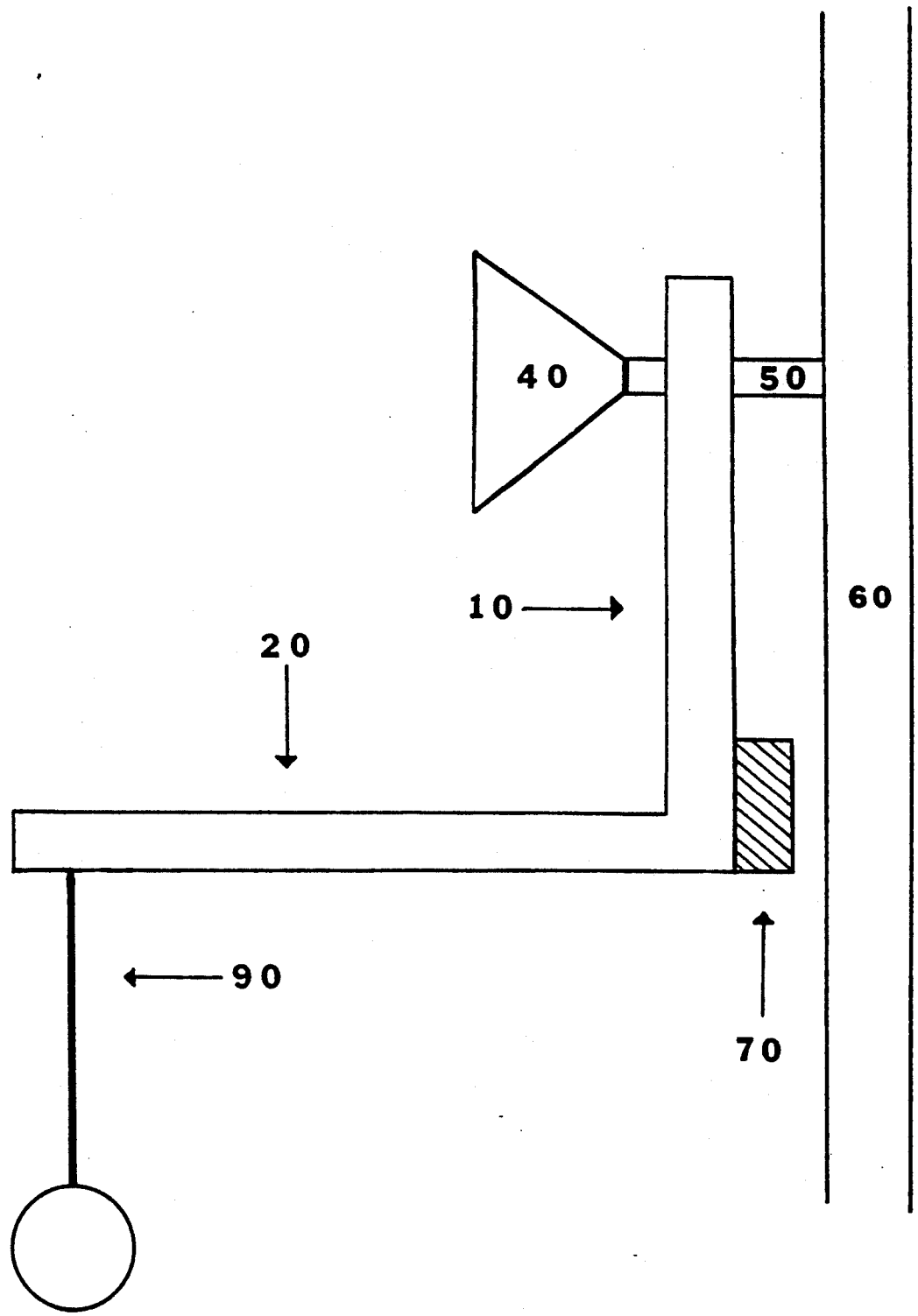
FIG. 2 is a side elevation view of the toy and exerciser, partly in perspective.

Referring more particularly to the drawings there is shown the body of the apparatus with the vertical portion 10, and the horizontal portion 20. Said vertical portion 10 having an inverted key hole 30 in its center. The key hole 30 with its larger area allowing the invention to be slipped over an existing door knob 40 and then slid downward, allowing the apparatus to be held in place on the door knob shaft 50 by the narrow portion of the hole. A sponge or rubber pad 70, mounted to the bottom edge of the vertical portion 10 of the invention, provides a cushion between said lower edge and the door 60. This being so in order to reduce noise and possible damage to the door. The hole 80, located on the outer edge of the horizontal portion 20, is where a rope 90 will be tethered terminating near the floor with a target attached.

This, it will be seen that I have provided a durable feline toy and exerciser. An apparatus which may be easily mounted to an existing door knob. Since it is obvious that numerous changes and modifications may be made in the above-described details without departing from the spirit and nature of the invention, it is understood that all such changes and modifications are included within the scope of the invention.

I claim:

1. An animal toy for use on a door knob of an existing dwelling entrance/exit door: said animal toy comprising,
   a. a body formed of right angularly connecting rigid planar elements comprised of a vertical surface and a horizontal surface.
   b. said vertical disposed surface having an aperture in its center for suspending said body from said door knob,
   c. said vertical disposed surface having an inner and an outer disposed side,
   d. the vertical surface having a cushion attached to the inwardly disposed side of the vertical surface to prevent damage to the door,
   e. the horizontal surface connected to said outer disposed side of the vertical surface,
   f. the horizontal surface having an aperture,
   g. a rope attached to said aperture and
   h. a target attached to said rope.

* * * * *